United States Patent
Goldman et al.

(10) Patent No.: US 12,176,161 B2
(45) Date of Patent: Dec. 24, 2024

(54) CONTACTOR DEVICE, ENERGY STORAGE SYSTEM AND METHOD FOR CONTROLLING A CONTACTOR DEVICE

(71) Applicant: MUNICH ELECTRIFICATION GMBH, Munich (DE)

(72) Inventors: Mark Goldman, Los Altos Hills, CA (US); Georg-Friedrich Graf, Munich (DE); Stefan Goede, Munich (DE); Sebastian Kleppe, Munich (DE)

(73) Assignee: MUNICH ELECTRIFICATION GMBH, Munich (DE)

( * ) Notice: Subject to any disclaimer, the term of this patent is extended or adjusted under 35 U.S.C. 154(b) by 186 days.

(21) Appl. No.: 18/011,063

(22) PCT Filed: Jul. 1, 2021

(86) PCT No.: PCT/EP2021/068209
§ 371 (c)(1),
(2) Date: Dec. 16, 2022

(87) PCT Pub. No.: WO2022/003115
PCT Pub. Date: Jan. 6, 2022

(65) Prior Publication Data
US 2023/0223221 A1  Jul. 13, 2023

(30) Foreign Application Priority Data
Jul. 3, 2020  (EP) ..................................... 20184037

(51) Int. Cl.
*H01H 33/08*   (2006.01)
*H01H 3/02*    (2006.01)
*H01H 33/02*   (2006.01)

(52) U.S. Cl.
CPC .......... *H01H 33/08* (2013.01); *H01H 33/025* (2013.01)

(58) Field of Classification Search
CPC .... H01H 33/08; H01H 33/025; H01H 3/0253; H01H 9/32; H01H 9/36; H01H 9/44;
(Continued)

(56) References Cited

U.S. PATENT DOCUMENTS

| | | | | |
|---|---|---|---|---|
| 5,783,987 A | * | 7/1998 | Kern | ...................... H01H 39/00 337/403 |
| 7,745,745 B2 | * | 6/2010 | Kordel | .................... F42B 3/006 200/61.08 |

(Continued)

FOREIGN PATENT DOCUMENTS

| | | |
|---|---|---|
| CH | 210902 A | 8/1940 |
| DE | 735838 C | 5/1943 |

(Continued)

OTHER PUBLICATIONS

Extended European Search Report for Application No. 20184037.8 dated Dec. 17, 2020 (9 pages).

(Continued)

*Primary Examiner* — William A Bolton
(74) *Attorney, Agent, or Firm* — Michael Best & Friedrich LLP (57) ABSTRACT

The present invention relates to a contactor device for high voltage applications, an energy storage system comprising the contactor device and a corresponding method for controlling the contactor device. A contactor device (100) comprises at least one fixed contact (106), at least one moveable contact (108), which is configured to move between an open position and a closed position, wherein in the closed position, the at least one moveable contact (108) electrically contacts the at least one fixed contact (106), and at least one first actuator (110, 120), which is configured to reversibly move the at least one moveable contact between the open position and the closed position. The contactor device (100) further comprises at least one second actuator (202) which is configured to move the at least one fixed contact (106) into a fired position, wherein in the fired position, the at least one fixed contact (106) is permanently disconnected from the at least one moveable contact (108).

15 Claims, 5 Drawing Sheets

(58) Field of Classification Search
CPC .......... H01H 9/30; H01H 50/42; H01H 50/62;
H01H 50/643; H01H 89/00; H01H 39/00;
H01H 2039/008; H01H 1/54
USPC ......... 218/146, 148, 12, 36, 40, 45; 200/400
See application file for complete search history.

(56) References Cited

U.S. PATENT DOCUMENTS

| | | | | |
|---|---|---|---|---|
| 8,432,246 | B2* | 4/2013 | Suzuki | B60L 3/04 |
| | | | | 361/115 |
| 9,905,383 | B2* | 2/2018 | Hori | B60L 3/0007 |
| 10,211,014 | B2* | 2/2019 | Kim | H01H 85/0241 |
| 10,424,448 | B2* | 9/2019 | Goldman | H01H 9/342 |
| 10,622,176 | B2* | 4/2020 | Volkmann | B60L 3/0007 |
| 2017/0229267 | A1* | 8/2017 | Lell | H01H 3/222 |
| 2018/0350540 | A1 | 12/2018 | Sullivan et al. | |
| 2020/0075277 | A1* | 3/2020 | McTigue | H01H 71/02 |

FOREIGN PATENT DOCUMENTS

| | | | |
|---|---|---|---|
| EP | 3242311 | A1 | 11/2017 |
| FR | 790991 | A | 11/1935 |
| WO | 2010061576 | A1 | 6/2010 |

OTHER PUBLICATIONS

International Search Report and Written Opinion for Application No. PCT/EP2021/068209 dated Aug. 20, 2021 (13 pages).

\* cited by examiner

CONTACTOR DEVICE, ENERGY STORAGE SYSTEM AND METHOD FOR CONTROLLING A CONTACTOR DEVICE

BACKGROUND OF THE INVENTION

The present invention relates to a contactor device, an energy storage system comprising the contactor device and a corresponding method for controlling the contactor device.

The use of contactor devices for connecting and disconnecting electronic circuits in an energy storage system is known state of the art. With the advanced development of electric vehicles (EV) or hybrid electric vehicles (HEV), high voltage energy storage systems become more and more common in vehicles. As such high voltage systems nowadays are typically capable of supplying voltages in a typical range between 400 V and 1 kV and may be even capable of supplying higher voltages in future applications, these high voltage energy storage systems present a greater shock hazard than traditional powertrains. Accordingly, the prevention of safety hazards and overcurrent protection is of utmost importance for these systems. For example, it is important to ensure the safety of the vehicle's passengers, of roadside assistance or of maintenance workers, in cases of malfunctions of the high voltage energy storage system or of an accident of the vehicle, which affects the electronic circuits of the energy storage system.

Accordingly, the safety requirements for contactor devices used to control current flow in an energy storage system are increasing, especially where the energy storage system is used for storing energy to drive a vehicle.

Firstly, the contactor device should be capable of carrying large load currents, which are expected under normal operating conditions of the energy storage system and which do not cause damage to the electronic circuit components of the energy storage system. For this purpose, the contactor device should withstand large electromagnetic repulsion forces, which may be induced between the contacts of the contactor device during current flow due to electromagnetic effects including for example the Lorentz force, as such large electromagnetic repulsion forces may lead to unwanted separation between the contacts of the contactor device. This separation of the contacts can easily lead to high voltage arcs between the contacts, thus causing significant contact degradation or even permanent welding of the contacts, which leads to permanent malfunction of the contactor device and makes it impossible to break fault currents should they occur.

Secondly, the current flow in the energy storage system should be interruptible immediately and permanently, in case that the operation conditions in the energy storage system become unsafe, for example due to overcurrent or malfunctions occurring in the electronic circuits of the energy storage system. Further, the current flow in the energy storage system should be interruptible immediately and permanently, in case that a vehicle, which is driven by the energy stored in the energy storage system, has an accident. For this purpose, it is known to use additional overcurrent protection devices, which quickly and permanently separate the electronic circuits of the energy storage system. One example for such an overcurrent protection device is a fuse, which uses a metal wire or a strip that melts, when overcurrent occurs. Recently, also the use of pyroelectric devices, also known as pyrofuses, has been established as overcurrent protection in energy storage systems. Such pyrofuses are usually activated by triggering a pyroelectric charge, for example in case of an accident of the vehicle, which then for example sever a busbar being mounted in the supply line of the energy storage system.

On the other hand, the use of an overcurrent protection device in addition to a contactor device requires precious space and additional design considerations, especially when used in a vehicle, but also when used for a stationary energy storage system, for accommodating and integrating both devices into the electronic circuits of the energy storage system.

To overcome this problem, it is known from US 2018/0350540 A1 to provide a contactor device with a supplemental pyrotechnic element, which functions as a circuit break or fuse-like element to protect against overcurrent, by forcing the contacts of the contactor device to open in their standard direction at great speed and distance.

However, the inventors of the present invention have recognized that there is still a need for improvement in the integration of the normal operation functions and the protection separation functions in a contactor device, especially with respect to the design freedom of the normal operation actuation and the protection separation actuation.

SUMMARY OF THE INVENTION

In particular, the present invention provides a contactor device for high voltage applications. The contactor device comprises at least one fixed contact, at least one moveable contact, which is configured to move between an open position and a closed position, wherein in the closed position, the at least one moveable contact electrically contacts the at least one fixed contact, and at least one first actuator, which is configured to reversibly move the at least one moveable contact between the open position and the closed position.

The present invention is based on the idea, that the contactor device further comprises at least one second actuator which is configured to move the at least one fixed contact into a fired position, wherein in the fired position, the at least one fixed contact is permanently disconnected from the at least one moveable contact.

In other words, the present invention provides a dedicated moveable current carrying element for reversible contact connection and disconnection under normal operation conditions as well as an independent current carrying element, which is stationary under normal operation conditions, and can be irreversibly displaced to permanently interrupt the current flowing through the contactor device in case of predefined abnormal operation conditions. This arrangement has the advantage that the actuation mechanism for regular operation of the contactor device and the actuation mechanism for safety operation of the contactor device can be designed and operated independently from each other. Accordingly, the force generated by the second actuator can be used completely for displacing the at least one fixed contact and a contact separation at greater speed and distance can be achieved. Furthermore, there is less opportunity for a failure of both actuation mechanisms simultaneously, so that the operation reliability of the contactor device can be enhanced.

According to an advantageous embodiment of the present invention, the at least one second actuator is a pyrotechnic actuator.

According to another advantageous embodiment of the present invention, the at least one second actuator comprises a pyroelectric charge, which is ignited for moving the at least one fixed contact into the fired position. In this manner, it is ensured that the second actuator is capable of permanently interrupting the current flowing through the contactor device within a time in the range of a few milliseconds and of producing enough mechanical work to separate the at least one fixed contact from the at least one moveable contact at a relatively great distance, for example in a range of around 20-50 mm or larger.

According to a further advantageous embodiment, the at least one second actuator is activated in response to an electric control signal. The electric control signal may be for example received in case of an overcurrent or in case of gross control failures of the loads attached to an energy storage device of an energy storage system, which comprises the contactor device, in order to avoid damaging to the energy storage system. Alternatively, the electronic control signal may be received from an electronic control unit (ECU) of a vehicle, in which the contactor device is mounted for controlling the current flow, for example after detection of an accident of the vehicle.

In order to permanently interrupt the flow of current through the contactor device in the fired position, the at least one fixed contact may be irreversibly displaced in the fired position.

Advantageously, the contactor device may further comprise at least one arc suppressing element. The arc suppressing elements may for example comprise one or more mechanical devices, such as an array of arc splitter plates or an arc blowout magnet, which can control the development of arcing. Alternatively or additionally, the arc suppressing elements may also comprise a gas generator charge, which is ignited when the second actuator is activated, in order to generate a gas that cools the arc or mixes the arc with air.

According to a further advantageous embodiment, the axis of mechanical motion of the at least one moveable contact during movement between the closed position and the open position is different from the axis of mechanical motion of the at least one fixed contact during movement into the fired position. In this manner, the present invention ensures that the at least one fixed contact moves into the fired position at an angle with respect to the movement of the at least one moveable contact between the open position and the closed position.

In other words, the present invention provides a movement path for the at least one fixed contact into the fired position, which is not affected by the movement of the at least one moveable contact. Hence, the force applied by the second actuator can be used completely for separating the at least one fixed contact from the at least one moveable contact and does not need to work against a holding force provided by the first actuator. Accordingly, operation of the first and the second actuator can be optimized independently.

In order to provide a space saving movement path for the at least one fixed contact into the fired position, the at least one fixed contact may be configured to rotate at least partly around the axis of mechanical motion during movement into the fired position. Alternatively, the at least one fixed contact may also be configured to linearly move into the fired position, so as to provide a simplified force transmission between the second actuator and the at least one fixed contact.

According to a further advantageous embodiment, the at least one fixed contact comprises a hinge flexure, which is configured to allow the at least one fixed contact to swing into the fired position. In this manner, the movement of the at least one fixed contact into the fired position can be further supported by the design of the at least one fixed contact.

Advantageously, the hinge flexure may be arranged between a terminal of the at least one fixed contact and a contact point for contacting the at least one moveable contact. In this manner, a well defined movement of the contact point can be defined by the position of the hinge flexure between the contact point and the terminal of the at least one fixed contact.

For establishing efficient force transmission, the at least one second actuator may comprises at least one bolt, which is adapted to direct a force generated by the at least one second actuator towards the at least one fixed contact.

In order to avoid accidental powering of the contactor device after activation of the second actuator, the at least one second actuator may be further configured to disable the operation of the at least one first actuator, when the at least one fixed contact is moved into the fired position. For this purpose, the at least one second actuator may for example mechanically disable the first actuator or may sever the power supply of the first actuator in order to deactivate and disable the first actuator.

According to a further advantageous embodiment, the contactor device comprises a plurality of moveable contacts and a plurality of fixed contacts, and the at least one second actuator is configured to simultaneously move each of the plurality of fixed contacts into the fired position. In this manner, the force generated by the second actuator is efficiently used to simultaneously generate multiple interruptions of the current path, which flows through the contactor device, thus increasing the voltage interruption capability of the device.

The present invention also relates to an energy storage system, which comprises at least one energy storage device and the contactor device according to the present invention. The energy storage system may be for example provided in a vehicle for powering the motor of the vehicle. Alternatively, the energy storage system may be a stationary energy storage system, for example used for storing renewable or conventionally generated energy.

According to an advantageous embodiment, the energy storage system further comprises a controller, which is configured to control the at least one first actuator to reversibly move the at least one moveable contact between the open position and the closed position, and to activate the at least one second actuator, in case that operation outside the normal operating conditions is detected in the energy storage system. Operation outside the normal operating conditions, which are also signified as abnormal operation conditions, may for example be detected, when an electric current in the energy storage system exceeds a predetermined threshold, in case of overcharging of the energy storage device, or in case that an accident of the vehicle, which is equipped with the energy storage system, is detected for example by a sensor of the vehicle. However, abnormal operation conditions may also be defined for any other use conditions which could lead to enhanced presence of a shock hazard.

The present invention also relates to a method of controlling a contactor device for high voltage applications, wherein the contactor device comprises at least one fixed contact and at least one moveable contact, which is configured to move between an open position and a closed position, wherein in the closed position, the at least one moveable contact electrically contacts the at least one fixed contact. The method comprises the steps of:

controlling at least one first actuator of the contactor device to reversibly move the at least one moveable contact between the open position and the closed position; and controlling at least one second actuator to move the at least one fixed contact into a fired position, wherein in the fired position, the at least one fixed contact is permanently disconnected from the at least one moveable contact.

In the following, the invention is described in more detail in reference to the attached figures and drawings. Similar or corresponding details in the figures are marked with the same reference numerals.

The accompanying drawings are incorporated into the specification and form a part of the specification to illustrate several embodiments of the present invention. These drawings, together with the description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. The following described embodiments can thus be considered either alone or in an arbitrary combination thereof. The described embodiments are merely possible configurations, and it must be borne in mind that the individual features, as described above, can be provided independently of one another, or can be omitted altogether while implementing this invention. Further features and advantages will become apparent from the following, more particular description of the various embodiments of the invention, as illustrated in the accompanying drawings in which like references refer to like elements, and wherein:

DETAILED DESCRIPTION

Figure 1:
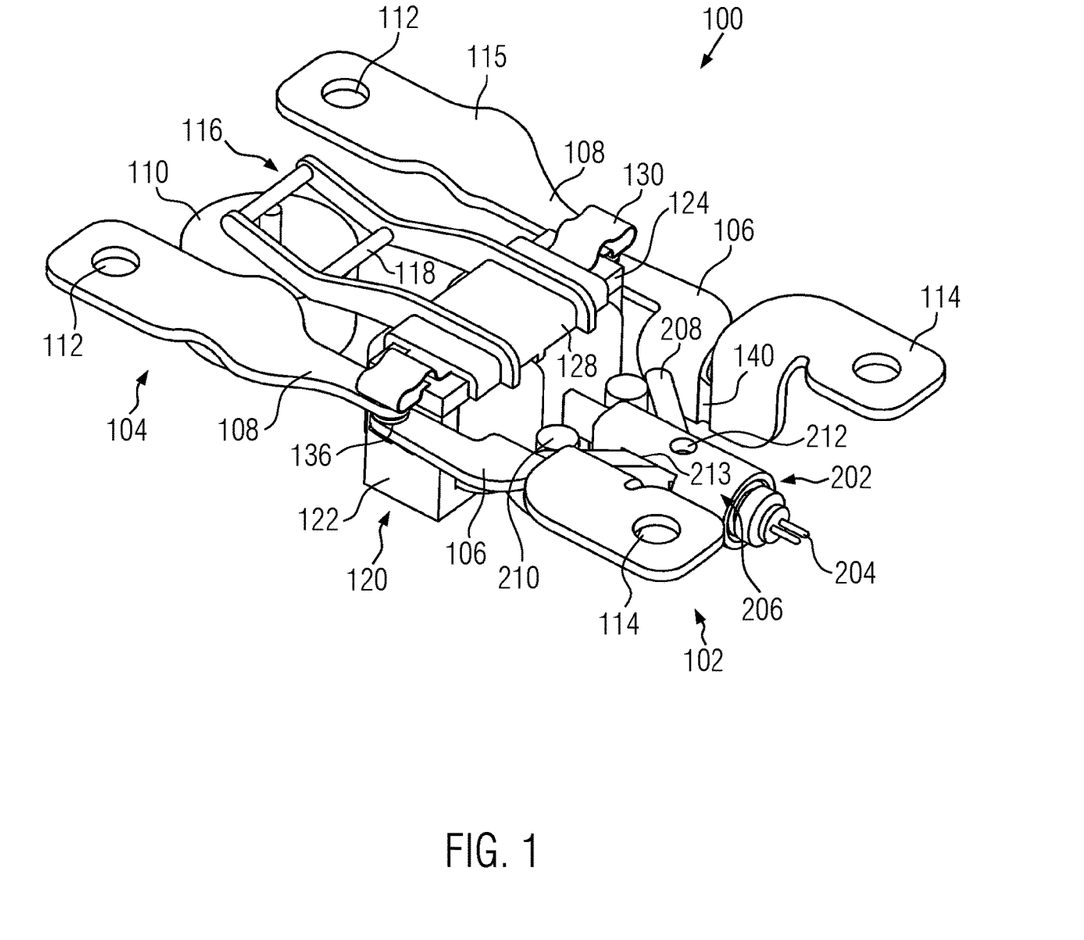
FIG. 1 shows a schematic perspective view of a contactor device according to an embodiment of the present invention.

The present invention will now be explained in more detail with reference to the Figures and firstly referring to FIG. 1. FIG. 1 shows a perspective view of a contactor device 100 according to a first embodiment of the present invention, which comprises a stationary part 102 and a moveable part 104. The stationary part 102 and the moveable part 104 are preferably provided unsealed, but may be also housed in a sealed housing.

In the example of FIG. 1, the stationary part 102 has two fixed contact 106 and the moveable part 104 has two moveable contacts 108, so that the contactor device 100 can function as a 2 pole combination contactor, which under normal operating conditions functions as 2 pole single-break style contactor. Here, the functions of each of the fixed contacts 106 and each of the moveable contacts 108 are mirrored. However, it should be noted here that the number two moveable contacts 108 and two fixed contacts 106 is not essential for the present invention, but the present invention is applicable for contactor devices having any number of moveable contacts and fixed contacts. In particular, the contactor device 100 may solely comprise one moveable contact and one fixed contact. Similarly, it should be noted that the present invention may not only be applied to single-break style contactor devices, but may be also applied to double-break style contactor devices, comprising a pair of fixed contacts and one moveable contact or any other break configuration, involving variable numbers of fixed contacts and moveable contacts.

The fixed contacts 106 and the moveable contacts 108 can be made from any suitable electrically conducting material, which may comprise for example various metals or metallic materials like copper and its alloys or any electric conducting material that is known in the art.

FIG. 1 shows the moveable contacts 108 in a closed position, where each of the moveable contacts 108 electrically contacts one of the fixed contacts 106, so that a flow of electric current from each of the terminals 112 of the moveable part 104 to each of the terminals 114 of the stationary part 102 is enabled. The terminals 112 and 114 may be used for conductively coupling the contactor device 100 to external electronic circuits, for example an energy storage device or an electric load, which is driven by the voltage of the energy storage device. For reversibly connecting and disconnecting the current path through the contactor device 100, the contactor device comprises a motion actuator 110, which is capable of reversibly moving the at least one moveable contact 108 between the closed position and an open position, for example by use of a solenoid. While the position of the moveable contacts 108 is changed by the motion actuator 110, the fixed contacts 106 remain stationary during activation of the motion actuator 110 and the movement of the moveable contacts 108.

In the open position, the moveable contacts 108 are separated from the fixed contacts 106, so that the flow of electrical current through the contactor device 100 is prevented. In the closed position, the moveable contacts 108 electrically contact the fixed contacts 106, so that the flow of electrical current through the contactor device 100 is enabled.

In order to facilitate the reversible transition between the open position and the closed position, the moveable contacts 108 are formed in such a way that they are able to deflect elastically between the open and closed position. Preferably, this can be achieved by forming the moveable contacts 108 of a multi-layer structure, which comprises for example 10 to 15 layers of copper or other suitable electrically conducting material. For example, the multi-layered structure may be fabricated by welding, brazing, or diffusion bonding, in order to provide high quality joints between the layers. However, also any other suitable fabrication method may be used. In addition, each of the moveable contacts 108 may further comprise a bulge 115, for supporting the deflection capability of the moveable contacts 108

For transmitting a force applied by the motion actuator 110, the moveable part 104 may comprise a lever 116, which is rotatable mounted around a hinge 118. Accordingly, a longitudinal axis of the hinge 118 may define an axis of mechanical motion of the moveable contacts 108 during movement between the closed position and the open position. Alternatively, the force applied by the motion actuator 110 may for example be transmitted by a shaft and the moveable contacts may perform a linear motion during movement between the closed position and the open position.

Figure 4:
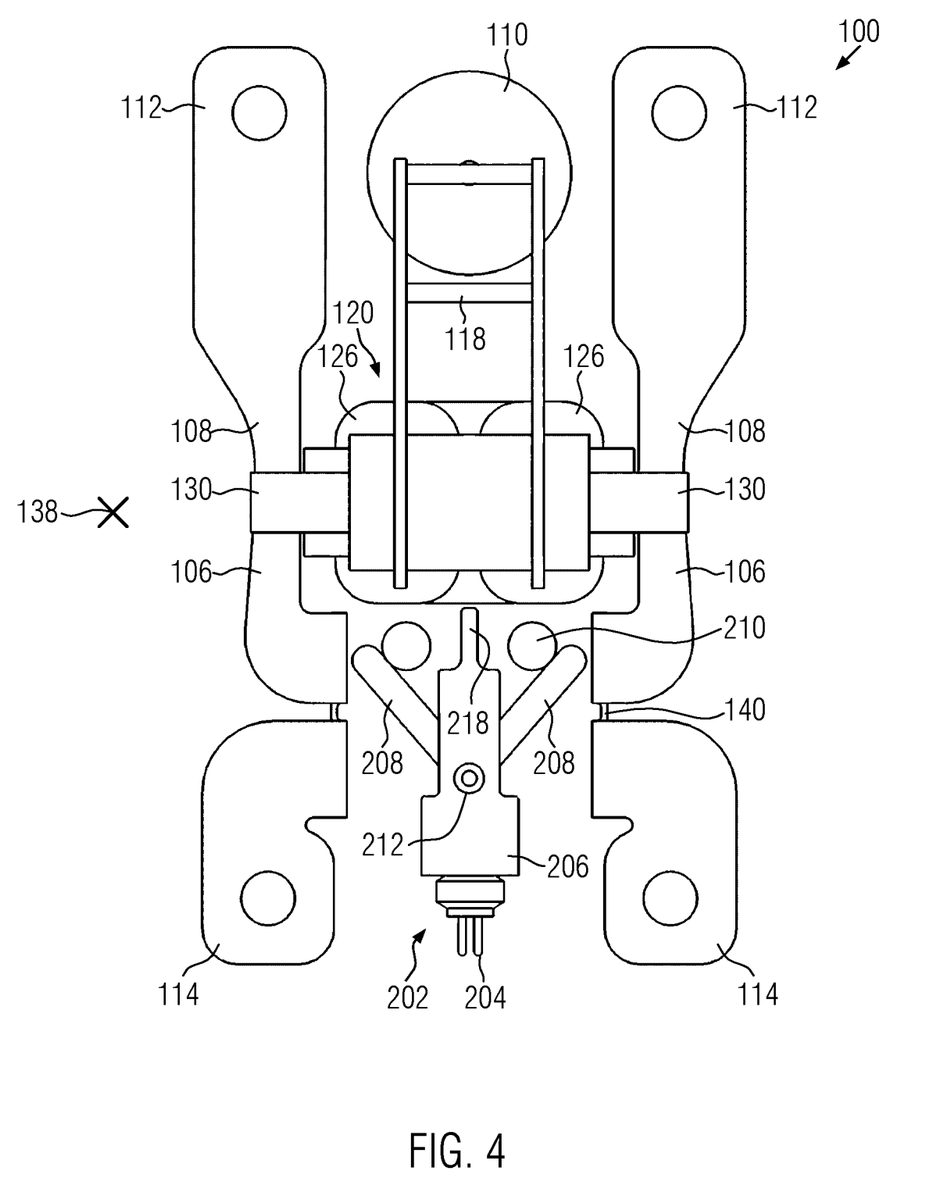
FIG. 4 shows a schematic top view of the contactor device of FIG. 1 in the closed position of the contactor device.

In addition, the contactor device 100 further comprises an electromagnetic actuator 120, which is configured to hold the moveable contacts 108 in the closed position. The electromagnetic actuator 120 comprises a yoke 122, an armature 124 and at least one coil 126 (for example, two coils are shown in FIG. 4). A support element 128, which at least partly encompasses the armature 124, mechanically connects the lever 116 and the armature with the moveable contacts 108.

Elastic projections 130 or other spring elements can be provided at the sides of the support element 128 for holding the moveable contacts 108. In this manner, it can be ensured that small dislocations or imbalances between the moveable contacts 108 during operation of the contactor device 100 can be absorbed by the support element 128 and do not affect the motion actuator 110 or greatly impact the force applied between the fixed contacts 106 and the moveable contacts 108, when the contactor device 100 is in the closed state. Accordingly, tolerances between the moveable contacts 108 and the fixed contacts 106 introduced during fabrication of the contactor device 100 can be better compensated. As shown in FIG. 1, the elastic projections may be formed in a U-shaped form to enhance the elasticity and may be fixed to the armature 124 at a peripheral end for enhancing the stability.

The fixed contacts 106 are mechanically connected to the yoke 122 by holding elements 132 (see FIG. 2), which for example may be affixed to the yoke 122 by welding or gluing. Alternatively, the holding elements 132 may be an integral part of the yoke 122 and may be formed already, when the yoke 122 is manufactured.

The electromagnetic actuator 120 is activated, when the moveable contacts 108 are in the closed position, so that a holding force, which results from the magnetic flux through the yoke 122 and the armature 124 is applied between the moveable contacts 108 and the fixed contacts 106. The magnetic flux is generated by energization of the coil (or coils) 126, so that the strength of the holding force can be determined by the number of wound turns of the coil 126 and the current flowing through the coil 126. Accordingly, the moveable contacts 108 are held in the closed position, when the coil 126 is energized.

The operation of the motion actuator 110 and the electromagnetic actuator 120 will now be explained in more detail with respect to FIGS. 2 and 3.

Figure 2:
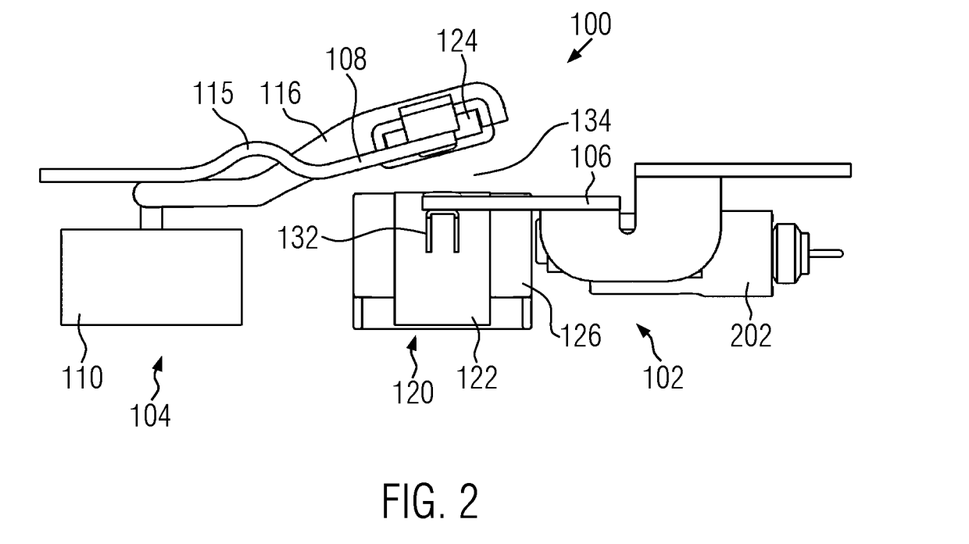
FIG. 2 shows a schematic side view of the contactor device of FIG. 1 in an open position of the contactor device.

FIG. 2 shows the contactor device 100 in an unpowered state, where the motion actuator 110 and the electromagnetic actuator 120 are not energized, so that the moveable contacts 108 are in an open position. As shown in FIG. 2, in the open position, the moveable contacts 108 are separated from the fixed contacts 106 by a spatial gap 134, which electrically isolates the moveable contacts 108 from the fixed contacts 106. Accordingly, in the open position of the moveable contacts 108, current flow through the contactor device 100 is prevented. By the separation of the actuation mechanism for moving and holding the moveable contacts, the spatial gap 134 can be made large enough, so that sufficient electrical isolation between the contacts can be provided for normal atmosphere. Accordingly, the need for providing a sealed housing or for using an electronegative gas can be dispensed, so that the design of the contactor device 100 can be remarkably simplified. However, it is also possible to provide a sealed housing and an electronegative gas for the internal components of the contactor device 100, in order to enhance the electrical isolation between separated contacts.

Furthermore, the spatial gap 134 may be chosen large enough, so that even accidental energization of the coil 126, for example due to a short of the coils electronics, does not result in a force large enough, to move the moveable contacts 108 into the closed position, as long as the motion actuator 110 is in the open position. In this manner, operation safety of the contactor device 100 can be further enhanced.

Figure 3:
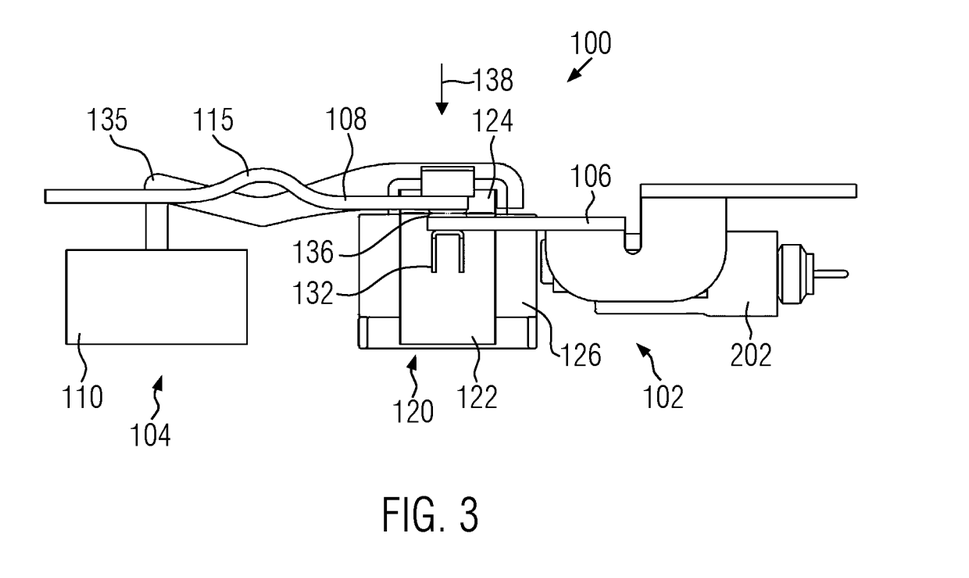
FIG. 3 shows a schematic side view of the contactor device of FIG. 1 in a closed position of the contactor device.

FIG. 3 shows the contactor device 100 in a powered state, where the moveable contacts 108 are in the closed position, so that the moveable contacts 108 electrically contact the fixed contacts 106 at least at contact points 136 of the fixed contacts 106. For reducing a contact resistance, the contact points of the fixed contacts 106 and of the moveable contacts 108 may be formed of silver or any silver alloy. However, also other suitable electrically conducting materials are possible.

For bringing the moveable contacts 108 from the open position into the closed position, the motion actuator actuates the lever 116 at an actuation point 135 of the lever 116, which is arranged on an opposite side of the lever from the support element 128. For example, the lever rotatably moves the moveable contacts 108 around the hinge 118 and the spatial gap 134 is reduced. For bringing the moveable contacts 108 from the closed position back into the open position, the contactor device 100 preferably comprises a spring (not shown in the Figures), which may be integrated into the motion actuator 110 or may be affixed to the lever 116.

Once, the spatial gap 134 is fully closed and the moveable contacts 108 electrically contact the fixed contacts 106, the coil 126 is energized. Because of the energization of the coil 126, a magnetic force is generated between the yoke 122 and the armature 124, which presses the armature 124 against the magnetic yoke 122, thereby holding the moveable contacts 108 in the closed position. A direction of the holding force, which points in the direction from the moveable contacts 108 to the fixed contacts 106, is indicated in FIG. 3 by the arrow 138.

When the coil 126 is fully energized and full holding force is applied to the moveable contacts 108, the motion actuator 110 may be powered off again, so that only the electromagnetic actuator 120 holds the moveable contacts 108 in the closed position. However, the motion actuator 110 may be also further actuated, when the coil 126 is fully energized, so as to additionally support the electromagnetic actuator 120 in holding the moveable contacts 108 in the closed position. Accordingly, the holding force applied in the contactor device 100 can be enhanced, without enlarging the coil 126.

Referring back to FIG. 1, it is shown that the contactor device 100 further comprises a pyrotechnic actuator 202, which is configured to permanently disconnect the fixed contacts 106 from the moveable contacts 108 when activated. For this purpose, the pyrotechnic actuator 202 is configured to move the fixed contacts 106 into a fired position when it is activated, where in the fired position, the fixed contacts 106 are separated from the moveable contacts 108 at a distance large enough, so that they are electrically isolated from each other and so that current flow through the contactor device 100 is interrupted. Preferably, hereby the pyrotechnic actuator 202 is configured to generate energy large enough to rapidly and irreversibly displace the fixed contacts 106, when they are pushed into the fired position, in order to permanently displace the fixed contacts 106 from their regular position. Thereby, displacing the fixed contacts 106 can refer to displacing the fixed contact assembly as a whole, or can refer to solely displacing the contact point 136 of the fixed contacts 106, for example by irreversibly deforming the fixed contact assembly as described later. In this manner, it is prevented that the moveable contacts 108 are still capable of contacting the fixed contacts 106 after activation of the pyrotechnic actuator 202. Consequently, current flow through the contactor device 100 can be interrupted permanently by the activation of the pyrotechnic actuator 202.

The pyrotechnic actuator 202 can comprise two or more pyrotechnic electrical terminals 204, sometimes also signified as pyrotechnic pins, which cause ignition of a pyrotechnic charge, in response to the reception of an electric control signal. The pyrotechnic charge may be an explosive, which is directly ignited by the electric control signal or may be a gas generator charge, which suddenly expands after reception of the electric control signal. Alternatively, the pyrotechnic charge may have a multiple charge structure, comprising for example an initiator charge and a secondary gas generator charge.

The pyrotechnic electrical terminals 204 may for example be connected to a current sensing controller integrated in the contactor device 100, which is configured to detect the current flowing through the contactor device 100 in the closed position. When the detected current exceeds a predetermined threshold, which may be represented by a level of current, which is dangerous for the functioning of the contactor device 100, the current sensing controller may transmit the electronic control signal to ignite the pyrotechnic charge, in order to permanently separate the fixed contacts 106 from the moveable contacts 108.

Alternatively, the pyrotechnic electrical terminals 204 of the pyrotechnic actuator 202 may be connected to an external controller or to a controller of a battery (battery management system), which may provide the electric control signal to the pyrotechnic actuator, for example in response to the detection of an overcurrent or a malfunction in an energy storage device, which is conductively coupled to the contactor device 100. The electric control signal may also be received in response to a detected anomaly or a malfunction in any other circuit component of an electric circuit to which the contactor device 100 is conductively coupled. As another alternative, the pyrotechnic electrical terminals 204 may be connected to an electronic control unit (ECU) or a crash sensor of a vehicle, which comprises the contactor device 100, and may receive the electronic control signal in response to the detection of an accident of the vehicle.

The pyrotechnic actuator 202 further comprises a piston structure 206, which can be driven away from its resting position by the force, which is generated when the pyrotechnic charge is ignited. Thereby, the piston structure may directly push against the fixed contacts 106 and cause the fixed contacts 106 to be pushed away from the moveable contacts 108. Alternatively, the pyrotechnic actuator 202 may comprise bolts 208, which transmit the energy generated by the piston structure to each of the fixed contacts 106, in order to cause the fixed contacts 106 to be pushed away from the moveable contacts 108. Hereby, it is preferable that a number of bolts 208 attached to the piston structure 206 is equal to a number of fixed contacts 106 of the contactor device, so that each of the bolts 208 can cause one of the fixed contacts 106 to be pushed away from the corresponding moveable contact 108 into the fired position. Accordingly, each of the current paths through the contactor device can be broken simultaneously by activation of the pyrotechnic actuator. Advantageously the bolts 208 are moveably (rotatable) attached to the piston structure, for example by a rivet 212 (see FIG. 4), which provides a simple and convenient attachment method. However, also other attachment methods, which allow flexible movement of the bolts 208 can be used.

Optionally, the contactor device 100 may comprise guiding elements 210, which may guide a direction of movement of the piston structure 206 or of the bolts 208 towards the fixed contacts 106. For example, each of the guiding element 210 may be formed of a pin, which is configured to constrain the freedom of the bolts' movement.

However, it should be noted that the transmission of the force resulting from the activation of the pyroelectric actuator 202 by means of the piston structure 206, the bolts 208 and the guiding elements 210 is just an example, and that there are many other ways to mechanically transmit the resulting force or generated gas volume to the fixed contacts 106, in order to displace the fixed contacts 106.

As further shown in FIG. 1, each of the fixed contact 106 may comprise a hinge flexure 140, which may be provided between the terminal 114 and the contact point 136 of the fixed contact 106. The hinge flexure 140 may allow the fixed contact 106 to swing away from the moveable contacts 108, when the fixed contacts are pushed away. Hereby, the position of the hinge flexure 140 between the terminal 114 and the contact point 136 may be adjusted in order to change the swinging radius of the fixed contact 106. Hence, a movement path of the fixed contacts 106 from the regular position into the fired position can be well defined.

The pyrotechnic actuator 202 may comprise an actuator housing 212, which at least partly encompasses the piston structure 206. The actuator housing 212 may provide an accommodation for the piston structure 206, when the piston structure 206 is in the resting position, before the pyrotechnic actuator 202 is activated. The piston housing may also provide piston stopping means, for stopping the piston structure 206, when the piston structure 206 reaches an end position and the fixed contacts 106 are in the fired position. In this manner, the contactor device 100 can provide a well defined path for the piston structure 206. The actuator housing 212 may also provide retaining means for retaining the piston structure 206 in the end position, so as to prevent that the piston structure 206 may move back into the resting position when the pyrotechnic actuator is activated. In this manner, the piston structure 206 can help to hold the fixed contacts 106 in the fired position, when the pyrotechnic actuator is activated. Additionally or alternatively, the actuator housing 212 may also provide retaining means for retaining the fixed contacts 106 in the fired position.

As shown in FIG. 1, the actuator housing 212 may optionally comprise cutouts 213 for the bolts 208, which may be configured to restrict the freedom of the movement of the bolts 208 during the movement of the piston structure 206 from the resting position into the end position.

The contactor device 100 may also comprise arc suppressing elements, in order to extinguish an arc, which may be generated by the rapid break of the current carrying path, when the pyrotechnic actuator 202 is activated. For example, the contactor device 100 may comprise one or more arc blowout magnets, which are used to control the development of arcing, or may comprise an array of arc splitting plates, which are configured for splitting and cooling the arc into multiple individual arcs having lower energy. Alternatively, the arc suppressing elements may comprise mechanical devices, which may be inserted between the fixed contacts 106 and the moveable contacts 108, when the pyrotechnic actuator 202 is activated. Alternatively or additionally, the arc suppressing elements may also comprise a gas generator charge, which is ignited when the pyrotechnic actuator 202 is activated, in order to generate a gas that cools the arc or mixes the arc with air.

The operation of the pyrotechnic actuator 202 will now be explained in more detail with respect to FIGS. 4 and 5. Here, the pyrotechnic actuator 202 is shown without the actuator housing 212.

FIG. 4 shows a top view of the of the contactor device 100 in the closed position of the moveable contacts 108 and in a state before the pyrotechnic actuator 202 is activated. As described above, in this position the moveable contacts 108 are electrically contacting the fixed contacts 106. A holding force, which points at a direction from the moveable contacts 108 towards the fixed contacts 106, holds the moveable contacts 108 in the closed position. As indicated by a cross, the direction 138 of the holding force is pointing into the paper level in the example of FIG. 4.

Figure 5:
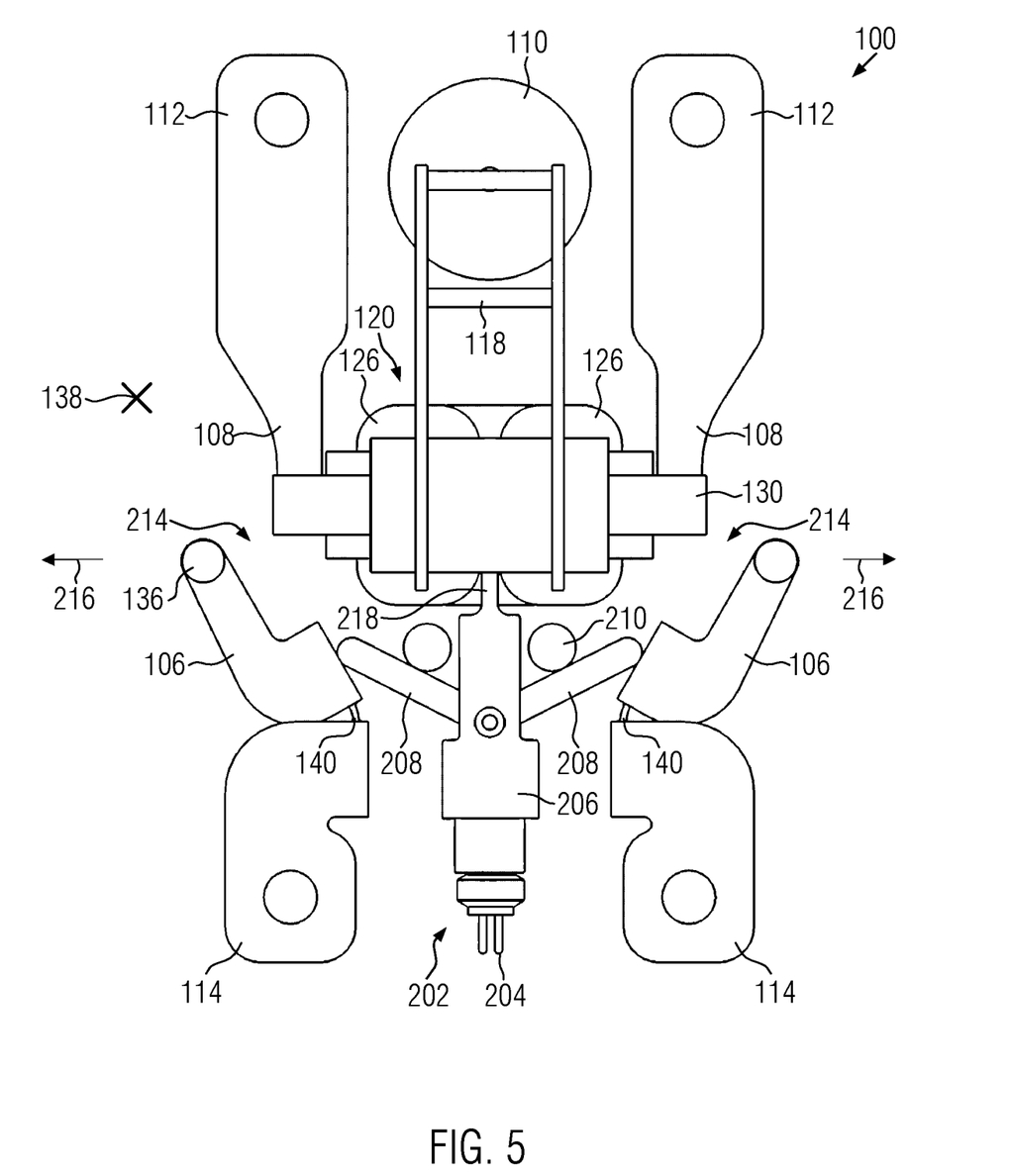
FIG. 5 shows a schematic top view of the contactor device of FIG. 1 in a fired position of the contactor device.

FIG. 5 shows a top view of the of the contactor device 100 in a state where the pyrotechnic actuator 202 has been activated. The piston structure 206 is driven away from its resting position by the force, which is generated when the pyrotechnic charge is ignited. The piston structure 206 drives the bolts 208 to cause the fixed contacts 106 to be moved from their regular position into the fired position, where a disconnection gap 214 separates the fixed contacts 106 from the moveable contacts 108. As indicated by the arrows, the separation force 216, which is applied by the pyrotechnic actuator 202 to the fixed contacts 106, during the movement of the fixed contacts 106 into the fired position, acts in a plane, which is perpendicular to the direction of the holding force 138 applied to the moveable contacts 108 by the electromagnetic actuator 120. However, it is not essential for the present invention that the plane, in which the separation force 216 acts, is perpendicular to the direction of the holding force 138. The separation force 216 may also only enclose a predetermined angle with the holding force 138 and have at least one force component, which is orthogonal to the direction of the holding force 138.

In this manner, it can be ensured that the fixed contacts 106 are moved into the fired position, without affecting the moveable contacts 108 or the actuation mechanism for moving and holding the moveable contacts 108 in the closed position. Similarly, it is prevented that the motion of the fixed contacts 106 into the fired position is affected by the moveable contacts 108, the motion actuator 110 or the electromagnetic actuator 120, as the force generated by the pyrotechnic actuator 202 does not work against the forces generated by the motion actuator 110 or the electromagnetic actuator 120. Hence, the fixed contacts 106 can move into the fired position on a movement path, which is independent from the movement path of the moveable contacts 108 between the open position and the closed position. Accordingly, the motion actuator 110, the electromagnetic actuator 120 and the pyrotechnic actuator 202 can be designed and optimized independent from each other and do not affect each other's operation.

In addition, the pyrotechnic actuator 202 may be configured to disable the actuation mechanism, which holds the moveable contacts 108 in the closed position. For example, the force generated by the ignition of the pyrotechnic charge may be large enough, so that the piston structure 206 is capable of separating the armature 124 from the yoke 122 and/or mechanically deform the coil 126, when the pyrotechnic actuator is activated. Alternatively or in addition, a head portion 218 of the piston structure 206 may comprise one or more blades, which are configured to sever the supply lines of the motion actuator 110 and of the electromagnetic actuator 120, when the pyrotechnic actuator 202 is activated. In this manner, it is possible to deactivate the actuation mechanism, which holds the moveable contacts 108 in the closed position, so that the distance between the moveable contacts 108 and the fixed contacts 106 can be further enhanced. Furthermore, it is possible to prevent accidental powering of the contactor device 100, after activating the pyrotechnic actuator 202.

As shown in the example of FIG. 5, each of the hinge flexures 140 provides an axis of mechanical motion, around which the fixed contacts 106 rotate during movement into the fired position. Preferably, this axis of mechanical motion is different from an axis of mechanical motion, around which the moveable contacts 108 move between the open position and the closed position. In FIG. 5, the axis of mechanical motion of the moveable contacts 108 is for example provided by the longitudinal direction of the hinge 118 and is thus shown to be perpendicular to the axis of mechanical motion of the fixed contact 106 during movement into the fired position. However, it is clear for the skilled person that the axis of mechanical motion of the fixed contact 106 during movement into the fired position can also be provided for example by a position of a working point where the separation force 216 is transmitted from the pyrotechnic actuator 202 to the fixed contacts 106.

Furthermore, the movement of the fixed contacts 106 into the fired position is not restricted to rotational movement, but the fixed contacts may also be moved linearly into the fired position, preferably on a movement path, which is independent from the movement path of the moveable contacts 108 between the open position and the closed position. For example, the direction of linear motion of the fixed contacts 106 into the fired position can be parallel to or include a predetermined angle with the axis of mechanical motion, around which the moveable contacts 108 move between the open position and the closed position.

Figure 6:
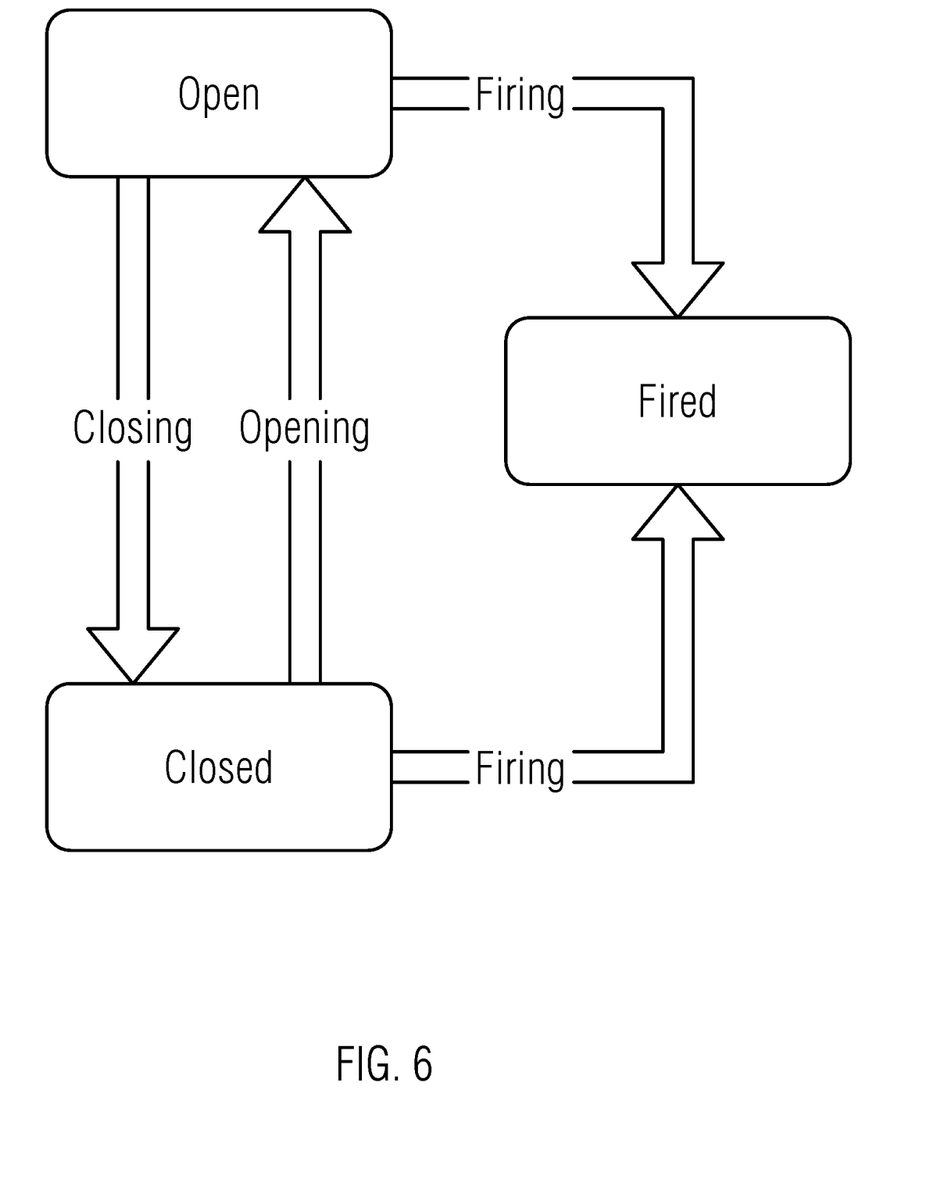
FIG. 6 shows a graphic illustrating a state diagram of the contactor device.

FIG. 6 shows a diagram illustrating an operation principle of the contactor device. As shown on the left side of FIG. 6, it is possible to reversibly move the moveable contacts 108 between the open position and the closed position by controlling the operation of the motion actuator 110 and the electromagnetic actuator 120. During movement of the moveable contacts 108, the fixed contacts 106 permanently stay stationary. However, as shown on the right side of FIG. 6, when the pyrotechnic actuator 202 is activated, the fixed contacts 106 are moved into the fired position, thus permanently separating the fixed contacts 106 from the moveable contacts 108 to interrupt the current flow through the contactor device 100. In other words, while the motion actuator 110 and the electromagnetic actuator 120 are configured for reversibly moving and holding the moveable contacts 108, in order to reversibly change the conduction state of the contactor device 100, the pyrotechnic actuator 202 is configured to irreversibly move the fixed contacts 108 into the fired position, in order to irreversibly break the current flow through the contactor device 100. Remarkably, activation of the pyrotechnic actuator is possible both in the open position and in the closed position of the moveable contacts 108, i.e. independent of the position of the moveable contacts 108 or the operation of the motion actuator 110 or the electromagnetic actuator 120.

Notably, the present invention is not limited to the use of a pyrotechnic actuator for moving the fixed contacts 106 into the fired position. Also another type of actuator, for example an electromagnetic actuator, may be used to permanently move the fixed contacts 106 from their regular position into the fired position. Similarly, the present invention is not limited to the use of separate actuators for moving and holding the moveable contacts 108, but can be also applied to a contactor device, which comprises a single actuator, for example a single electromagnetic actuator, for both, moving and holding the moveable contacts 108.

The present invention also relates to an energy storage system, which comprises the contactor device 100. The energy storage system may for example be an energy storage apparatus, which comprises the contactor device 100 and at least one energy storage device, like a battery cell or a capacitor. The energy storage system may further comprise a controller or battery management system, which controls the operation of the at least one energy storage device and of the contactor device 100 and may monitor the operation conditions of the energy storage system. For example, the controller or battery management system may control the motion actuator 110 and the electromagnetic actuator 120 of the contactor device 100 to reversibly move and hold the moveable contacts 108 between the open position and the closed position, when safe operating conditions are detected. However, in case that an operation outside the safe operation conditions (unsafe operation conditions), for example a malfunction of the contactor device 100 or the energy storage device, is detected, the controller or battery management system may control the pyrotechnic actuator 202 to move the fixed contacts 106 into the fired position. A malfunction of the contactor device may for example include a welding of the fixed contacts 106 with the moveable contacts 108 or a current flowing through the contactor device 100 exceeding a predetermined threshold. A malfunction of the energy storage device may for example include overcharging of the energy storage device or operation of the energy storage device outside a predetermined temperature range.

Further, the energy storage system may also comprise one or more additional electronic circuit components, such as a load, which is powered by the energy storage device, and the pyrotechnic actuator 202 may be activated, in case that any malfunction of the additional electronic circuit component is detected.

| REFERENCE NUMERALS | |
|---|---|
| 100 | Contactor device |
| 102 | Stationary part |
| 104 | Moveable part |
| 106 | Fixed contact |
| 108 | Moveable contact |
| 110 | Motion actuator |
| 112 | Terminal of the moveable contact |
| 114 | Terminal of the fixed contact |
| 115 | Bulge |
| 116 | Lever |
| 118 | Hinge |
| 120 | Electromagnetic actuator |
| 122 | Yoke |
| 124 | Armature |
| 126 | Coil |
| 128 | Support element |
| 130 | Projection |
| 132 | Holding element |
| 134 | Spatial gap |
| 135 | Actuation point |
| 136 | Contact point |
| 138 | Direction of the holding force |
| 140 | Hinge flexure |
| 202 | Pyrotechnic actuator |
| 204 | Pyrotechnic electrical terminals |
| 206 | Piston structure |
| 208 | Bolt |
| 210 | Guiding element |
| 212 | Rivet |
| 213 | Cutout |
| 214 | Disconnection gap |
| 216 | Direction of the separation force |
| 218 | Head portion |

The invention claimed is:

1. A contactor device (100) for high voltage applications, the contactor device comprising:
   at least one fixed contact (106);
   at least one moveable contact (108), which is configured to move between an open position and a closed position, wherein in the closed position, the at least one moveable contact (108) electrically contacts the at least one fixed contact (106); and
   at least one first actuator (110, 120), which is configured to reversibly move the at least one moveable contact between the open position and the closed position; and
   at least one second actuator (202) which is configured to move the at least one fixed contact (106) into a fired position, wherein in the fired position, the at least one fixed contact (106) is permanently disconnected from the at least one moveable contact (108).

2. The contactor device (100) according to claim 1, wherein the at least one second actuator (202) is a pyrotechnic actuator.

3. The contactor device (100) according to claim 1, wherein the at least one second actuator (202) comprises a pyroelectric charge, which is ignited for moving the at least one fixed contact (106) into the fired position.

4. The contactor device (100) according to claim 1, wherein the at least one second actuator (202) is activated in response to an electric control signal.

5. The contactor device (100) according to claim 1, wherein the at least one fixed contact (106) is irreversibly displaced in the fired position.

6. The contactor device (100) according to claim 1, wherein the contactor device further comprises at least one arc suppressing element.

7. The contactor device (100) according to claim 1, wherein an axis of mechanical motion of the at least one moveable contact (108) during movement between the closed position and the open position is different from an axis of mechanical motion of the at least one fixed contact (106) during movement into the fired position.

8. The contactor device (100) according to claim 7, wherein the at least one fixed contact (106) is configured to rotate at least partly around the axis of mechanical motion during movement into the fired position.

9. The contactor device (100) according to claim 1, wherein the at least one fixed contact (106) comprises a hinge flexure (140), which is configured to allow the at least one fixed contact (106) to swing into the fired position and/or wherein the hinge flexure (140) is arranged between a terminal (114) of the at least one fixed contact and a contact point (136) for contacting the at least one moveable contact (108).

10. The contactor device (100) according to claim 1, wherein the at least one second actuator (202) comprises at least one bolt (208), which is adapted to direct a force generated by the at least one second actuator (202) towards the at least one fixed contact (106).

11. The contactor device (100) according to claim 1, wherein the at least one second actuator (202) is further configured to disable the at least one first actuator (110, 120), when the at least one fixed contact (106) is moved into the fired position.

12. The contactor device according to claim 1, wherein the contactor device (100) comprises a plurality of moveable contacts (108) and a plurality of fixed contacts (106), and wherein the at least one second actuator (202) is configured to simultaneously move each of the plurality of fixed contacts into the fired position.

13. An energy storage system, which comprises at least one energy storage device and the contactor device (100) according to claim 1.

14. The energy storage system according to claim 13, further comprising a controller, which is configured to control the at least one first actuator (110, 120) to reversibly move the at least one moveable contact (108) between the open position and the closed position, and to activate the at least one second actuator (202), in case that operation outside the normal operating conditions is detected in the energy storage system.

15. A method of controlling a contactor device (100) for high voltage applications, wherein the contactor device comprises at least one fixed contact (106) and at least one moveable contact (108), which is configured to move between an open position and a closed position, wherein in the closed position, the at least one moveable contact (108) electrically contacts the at least one fixed contact (106), the method comprises the steps of:
  controlling at least one first actuator (110, 120) of the contactor device to reversibly move the at least one moveable contact (108) between the open position and the closed position; and
  controlling at least one second actuator (202) to move the at least one fixed contact (106) into a fired position, wherein in the fired position, the at least one fixed contact (106) is permanently disconnected from the at least one moveable contact (108).

* * * * *